United States Patent
Perng

(10) Patent No.: US 6,625,476 B1
(45) Date of Patent: Sep. 23, 2003

(54) USER INTERFACE APPARATUS, AND ASSOCIATED METHOD, FOR FACILITATING HANDS-FREE OPERATION OF A RADIO DEVICE

(75) Inventor: Bruce Y. Perng, San Diego, CA (US)

(73) Assignee: Nokia Corporation, Espoo (FI)

( * ) Notice: Subject to any disclaimer, the term of this patent is extended or adjusted under 35 U.S.C. 154(b) by 364 days.

(21) Appl. No.: 09/584,872

(22) Filed: Jun. 1, 2000

(51) Int. Cl.$^7$ ................................................ H04B 1/38
(52) U.S. Cl. ..................... 455/569; 455/568; 455/416; 455/417; 379/202.01
(58) Field of Search ................................. 455/568, 569, 455/41, 88, 575, 90, 563, 564, 78, 414, 416, 417, 109, 410; 379/201.01, 202.01

(56) References Cited

U.S. PATENT DOCUMENTS

| | | | | |
|---|---|---|---|---|
| 5,109,410 A | * | 4/1992 | Suhami et al. | 379/430 |
| 5,596,638 A | * | 1/1997 | Paterson et al. | 379/430 |
| 5,881,370 A | * | 3/1999 | Pottala et al. | 370/296 |
| 5,991,645 A | * | 11/1999 | Yuen et al. | 455/568 |
| 6,230,029 B1 | * | 5/2001 | Hahn et al. | 379/430 |
| 6,272,359 B1 | * | 8/2001 | Kivela et al. | 455/557 |
| 6,377,820 B1 | * | 4/2002 | Courtis et al. | 379/80 |
| 6,493,432 B1 | * | 12/2002 | Blum et al. | 379/88.12 |

* cited by examiner

*Primary Examiner*—Nay Maung
*Assistant Examiner*—Tan Trinh
(74) *Attorney, Agent, or Firm*—Milan I. Patel

(57) ABSTRACT

Apparatus, and an associated method for facilitating the performance of three-call operations, such as a call-waiting feature, at a mobile station. A user actuator, carried external to a mobile station, is connectable thereto. Actuation of the user actuator by a user of the mobile station initiates operation of a call-waiting procedure. The user actuator is carried by a user to permit convenient access to the actuator by the user, to be actuated, when desired.

14 Claims, 3 Drawing Sheets

USER INTERFACE APPARATUS, AND ASSOCIATED METHOD, FOR FACILITATING HANDS-FREE OPERATION OF A RADIO DEVICE

The present invention relates generally to a user interface for a radio device, such as a portable mobile station operable in a cellular communication system. More particularly, the present invention relates to apparatus, and an associated method, for facilitating hands-free operation of the radio device. A user actuator, connected to the circuitry of the radio device, is positioned external to the radio device to be easily accessible by a user of the device when the device is operated in the hands-free mode. The user actuates the actuator to initiate three-call calling operations, such as a call-waiting feature.

BACKGROUND OF THE INVENTION

The use of multi-user, radio communication systems has achieved wide popularity in recent years as advancements in communication technologies have permitted the affordable utilization of such communication systems by large numbers of users to communicate therethrough.

A radio communication system, like other types of communication systems, is formed, at a minimum, of a sending station and a receiving station interconnected by way of a communication channel. In a radio communication system, the communication channel is formed of a radio communication channel. A radio communication channel is defined upon a portion of the electromagnetic spectrum. In contrast, in a wireline communication system, the communication channel includes a wireline connection interconnecting the sending and receiving stations. Because a radio communication channel is used to communicate communication signals between the sending and receiving stations, a conventional wireline connection, required in a wireline communication system is not required to interconnect the sending and receiving stations to permit the effectuation of communications therebetween. The use of a radio communication system to communicate therethrough, as a result, is of particular advantage when formation of a wireline connection between the sending and receiving stations would be inconvenient or impractical.

A sending station of a radio communication system is operable to convert information which is to be communicated to the receiving station into a communication signal of characteristics which permits its communication upon the radio communication channel. To convert the information into such a communication signal, the sending station modulates the information signal upon a carrier waver of a carrier frequency within the range of frequencies which defines, at least in part, the communication channel. To convert the information into such a communication signal, the sending station modulates the information signal upon a carrier wave of a carrier frequency within the range of frequencies which defines, at least in part, the communication channel. A radio device which provides both a sending station and a receiving station at a common unit is sometimes referred to as a radio transceiver. Two-way communication is permitted through the use of a radio transceiver.

A cellular communication system is exemplary of a multi-user radio communication system, usage of which has achieved wide popularity in recent years. A radio transceiver operable in a cellular communication system is sometimes referred to as a mobile station. The mobile station is utilized by a user to communicate therethrough. Mobile stations are generally constructed to mimic operation of a conventional telephonic station operable in conventional wireline, telephonic network. Because, however, telephonic communication can be effectuated by way of a radio channel without the need for the formation of a wireline connection, telephonic communications can be effectuated through use of a cellular, or other radio, communication system.

Many mobile stations are of physical dimensions permitting the radio circuitry thereof together with a portable power supply to be housed within, or mounted to, a handset housing carriable by a user of the mobile station. Typically, the housing includes opposing end portions of which a first end includes a speaker element and second end portion includes a microphone. During use of the mobile station, the user positions the mobile station such that the speaker is positioned proximate to the user's ear and the microphone is proximate to the user's mouth. Telephonic communication is effectuated as the user is able both to listen to aural signals generated at the speaker and to speak into the microphone of the mobile station.

The requirement that the user hold the mobile station proximate to the user's ear and mouth, however, can, at times, be inconvenient to the user. For instance, when the user is driving a motor vehicle, the need to hold the mobile station during its use sometimes becomes a cumbersome task. Also, during extended use of the mobile station, the need to continuously hold the mobile station can be tiring to the user.

Headset assemblies are sometimes used to obviate the need of the user to hold the mobile station proximate to the user's ear and mouth during a communication session. The headset assembly typically includes a speaker element and a microphone connected by a cable, or other communication path, to the circuitry of the mobile station housed at the housing of the mobile station. Support structure which supports the speaker element and the microphone is worn by the user, typically supported on the user's head. The user is thereby able to use the mobile station to communicate therethrough without holding the mobile station during its operation in a communication session.

While use of a headset assembly advantageously obviates the need of the user to hold the mobile station during a communication session, the user is sometimes still required to access the mobile station during a communication session. For instance, some service subscriptions for service in a cellular communication system provide for "three-call" conversations. An exemplary three-call conversation is a "call-waiting" feature. In a call-waiting feature, when a user is involved in an ongoing communication session, and another call is to be terminated at the mobile station, the user of the mobile station is provided with an indication of the additional call. The user is able to place the first, ongoing communication session in a "on-hold" status and effectuate a second communication session associated with the second call.

Typically, although the user is able otherwise, through the use of a headset assembly, to operate the mobile station in a "hands-free" mode of operation, the user is still required to access the mobile station to switch between communication sessions. The existing requirement to access the mobile station to initiate the switching between communication session obviates part of the advantage associated with operating the mobile station in the hands-free mode.

If a manner could be provided by which better to facilitate such transfer without necessitating user access of the mobile station, improved convenience of operation of the mobile station would result.

It is in light of this background information related to radio communication systems that the significant improvements of the present invention have evolved.

SUMMARY OF THE INVENTION

The present invention, accordingly, advantageously provides a manner which facilitates hands-free operation of a radio device, such as a portable mobile station operable in a cellular communication system.

Through operation of an embodiment of the present invention, three-call calling operations, such as performance of a call-waiting feature, is able to be performed by a user of the radio device in a manner more convenient than that conventionally required to perform such operations. Increased convenience of use of the radio device results.

In one aspect of the present invention, a user actuator is provided which is actuable by a user to initiate effectuation of an action related to a three-call system includes a subscription for three-call calling operations, such as a call-waiting feature. The user actuator is actuable by a user of the mobile station to switch between a first communication session, i.e., a first call, and a second communication session, i.e., a second call.

Actuation of the user actuation for a brief time duration, for instance, places the first communication session in an "on-hold" status and switches the active-communication session to the second communication session. Upon actuation of the user actuator for a lengthier time period, the first communication session is terminated and the second communication session becomes the active communication session.

User actuation of the user actuator when the mobile station is not party to an ongoing communication session, for instance, initiates a mobile station-originated call. The mobile station-originated call is placed, e.g., to a calling station associated with a last-entered number. In this implementation, actuation of the user actuator causes a memory location to be accessed at which the last-entered dialing number is stored. The number is retrieved and used in a call initiation procedure.

When the first communication session is placed in an on-hold status, subsequent actuation of the user actuator for a brief actuation period places the second communication session on an on-hold status and the mobile station becomes party to the first communication session again. User actuation of the user actuator for an elongated time period terminates the second communication session and returns the mobile station to be party to the first communication session.

By positioning the user actuator at a location convenient to the user of the mobile station rather than directly at the mobile station, increased convenience of use of the mobile station is permitted when operated in the hands-free mode.

In these and other aspects, therefore, apparatus, and an associated method, is provided for a portable radio device operable in a radio operation. The user actuator is connectable to the circuitry of the radio device but is carriable separately by the user along with carriage of the radio device. The user actuator is thereby positionable at a location more convenient for the user to access, and thereafter actuate, than user actuators affixed directly at the radio device and conventionally required to be actuated to initiate performance of the three-call calling operation.

In another aspect of the present invention, the user actuator is coupled to form a portion of a headset assembly which is connectable to the radio device. The headset assembly permits, generally, hands-free operation of the radio device to which the headset assembly is coupled. The headset assembly includes a speaker element and a microphone together with a support assembly permitting the user of the radio device to wear the headset assembly. The speaker element and microphone are coupled to radio circuitry of the radio device, such as by way of a cable connection. A wireless connection, such as a Bluetooth, or IR (infrared) connection, alternately connects the headset assembly with the circuitry of the radio device. The user actuator is analogously also coupled to the circuitry of the radio device in the same manner as the manner by which the speaker element and the microphone of the headset assembly are coupled to the circuitry of the radio device. In an implementation in which the headset assembly is connected to the radio device by way of a connecting cable, the user actuator is positionable, e.g., to be affixed, by way of an affixing mechanism, to a shirt pocket of the user while the speaker element and microphone of the headset assembly are positioned proximate to the user's mouth and ear, in conventional manner. By positioning the user actuator at the shirt pocket of the user, or at any other convenient location, the user actuator is accessible by the user to permit actuation of the user actuator when desired.

In one implementation, the user actuator is connectable to a mobile station operable in a cellular, or other radio, communication system. A service subscription for service in the cellular, or other radio, communication communication system to communicate with a remote station. The radio device has radio circuitry housed at a radio housing. Use of the portable radio device by the user is facilitated during operation of an embodiment of the present invention. A user actuator is connectable to the radio device to form a portion thereof. The user actuator is separably carriable by the user along with carriage of the radio housing and the radio circuitry housed thereat. The user actuator is actuable by the user upon application of an actuation force thereon. Actuation of the user actuator selectably effectuates a selected communication session by way of the portable radio device.

A more complete appreciation of the present invention and the scope thereof can be obtained from the accompanying drawings which are briefly summarized below, the following detailed description of the presently-preferred embodiments of the invention, and the appended claims.

DETAILED DESCRIPTION OF THE PREFERRED EMBODIMENT

Figure 1:
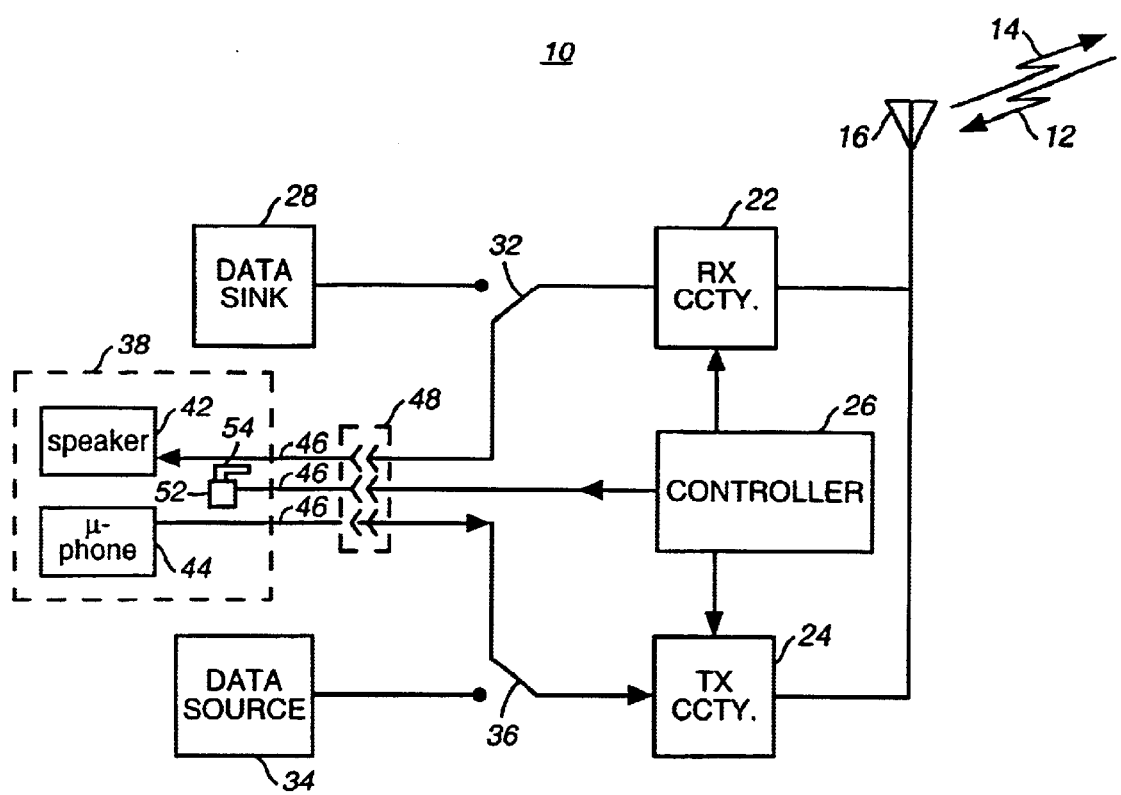
FIG. 1 illustrates a functional block diagram of a mobile station to which an embodiment of the present invention is connected to form a portion thereof to facilitate operation of the mobile station in a hands-free mode.

Referring first to FIG. 1, a mobile station, shown generally at 10, is operable in a radio communication system to transceive communication signals with network infrastructure (not shown) and, in turn, to a remote station coupled to the network infrastructure. Forward link signals generated at the network infrastructure are transmitted upon a radio link, here shown at 12, are transmitted to the mobile station to be received thereat. And, reverse-link signals generated at the mobile station are transmitted upon a radio link, here shown at 14, to be communicated to the network infrastructure and, in turn, to the remote station. Because the radio links 12 and 14 are utilized to form communication channels upon which to communicate both forward and reverse link communication signals, communications are effectuable by way of the mobile station without the need for a wireline connection therewith. Communications effectuated by the mobile station are thereby inherently mobile in nature.

In the exemplary implementation, the mobile station is operable in a cellular communication system, such as a GSM (Global System for Mobile communications) cellular communication system. In other implementations, the mobile station is also representative of other types of portable radio telephonic devices. Operation of an embodiment of the present invention is analogously operable in such other types of radio communication systems.

The mobile station 10 includes an antenna transducer 16 operable to transduce electromagnetic energy into electrical form and, conversely, to transduce electrical energy into electromagnetic energy. When a downlink signal is detected at the antenna transducer, the antenna transducer converts the electromagnetic energy of the signal into electrical form on the line 18. And, electrical signals provided to the antenna 16 for transmission to the network infrastructure are converted into electromagnetic form for transmission therefrom to the network infrastructure.

The antenna transducer is coupled, such as by way of a duplexer filter (not shown) to both the receive and transmit portions of the mobile station. Here, the line 18 is shown to extend both to receive circuitry 22 and to transmit circuitry 24 of the respective portions of the mobile station. The receive circuitry 22 is operable to perform conventional receive functions upon a receive signal, such as the forward link signal transmitted the link 12 to the mobile station. Receive functions performed upon the receive signal include, for instance, down-conversion and demodulation operations. Analogously, the transmit circuitry 24 is operable to perform conventional transmit functions upon data which is to be communicated by the mobile station. For instance, the transmit circuitry performs functions such as encoding, modulation, and up-conversion of data to be communicated by the mobile station. Once such operations are performed upon the data to be communicated, a transmit signal, at RF (Radio Frequency) levels and appropriate power levels are provided to the antenna transducer 16 by way of the line 18.

The mobile station 10 is further shown to include control circuitry 26 coupled to both the receive and transmit circuitry 22 and 24. The controller is operable, amongst other things, to control operation of the receive and transmit circuitry of the mobile station.

The receive circuitry 22 is selectably coupled to a data sink 28 by way of a bypass switch 32. When the bypass switch is positioned such that the receive circuitry is connected to the data sink, the receive signal, once acted upon by the receive circuitry, is provided to the data sink. Analogously, the transmit circuitry 24 is selectably coupled to a data source 34 by way of a bypass switch 36. When the bypass switch is positioned to connect the transmit circuitry with the data source, data sourced at the data source is provided to the transmit circuitry. The data sink and data source 28 and 34 are formed, conventionally, of a speaker element and microphone supported at the mobile station and utilized during normal operation of the mobile station.

A hands-free assembly 38 is here further shown to be connected to the mobile station to form a portion thereof. The headset assembly includes a speaker element 42 and a microphone 44 supported by support structure (not shown in FIG. 1). The speaker element and microphone are here connected to the elements of the mobile station by wire 46 forming a cable. The cable is connected to the elements of the mobile station, here by way of a plug connection 48 including a plug port supported at the housing of the mobile station. Connection of the headset assembly at the plug connector is determinative of the positioning of the bypass switches 32 and 36. When the headset assembly is connected to the mobile station at the plug connector, the bypass switches are positioned to connect the receive and transmit circuitry 22 and 24 of the mobile station to the elements of the headset assembly rather than the data sink and source 28 and 34. That is, by connecting the headset assembly to the mobile station to form a portion thereof, the receive circuitry 22 is caused to be connected to the speaker element 42 rather than the data sink 28. And, when the headset assembly is connected to the mobile station at the plug connector, the transmit circuitry 24 is connected to the microphone 44 rather than the data source 34. The user of the mobile station is able to communicate utilizing the mobile station by speaking into the microphone 44 and listening to the speaker element 42 when the headset assembly 38 is connected to the mobile station.

A user actuator 52 is also selectably connected to the mobile station 10 to form a portion thereof. The actuator 52, in the exemplary implementation, is formed of an actuation switch, actuable upon application of an actuation force thereon. In other implementations, the user actuator is formed of other types of switch elements. The user actuator 52 is also coupled by way of a wire which forms a portion of the cable 46 and which is connectable at the plug connector 48 along with connection of the speaker element 42 and microphone 44 at the plug connector. When connected at the plug connector, the user actuator becomes connected to the controller 26. Actuation of the user actuator is thereby detectable by the controller 26.

In the exemplary implementation, the user actuator is mounted together with a clip member 54 which permits the user actuator to be clippingly affixed to, e.g., an article of clothing worn by a user of the mobile station. Appropriate positioning of the user actuator positions the user actuator to be easily accessible by the user of the mobile station. When the headset assembly is connected to the mobile station, the mobile station is essentially operated in a hands-free mode in which the user need not hold the mobile station to communicate therethrough.

The user actuator is here operable to facilitate three-call operation of the mobile station. More particularly, the user actuator is here operable to facilitate performance of a call-waiting feature pursuant to which service can be subscribed by a user of the mobile station. A call-waiting feature provides a user of the mobile station with an indication of a second incoming call when an active communication session is already ongoing by way of the mobile station. When the second call is detected at the mobile station, the user of the mobile station is able to switch between calls, i.e., communication sessions, thereby to communicate, alternately, or concurrently pursuant to a conference call, the first communication session or the second communication session.

The user actuator is actuated pursuant to operation of an embodiment of the present invention to switch between calls. For instance, when the call-waiting feature is activated, and the user is communicating by way of the mobile station pursuant to a first communication session, a second call, to be terminated at the mobile station, is alerted to the user of the mobile station, such as by generation of an audible tone to alert the user of the second call.

If the user would like to accept the second call to form a second communication session, the user actuates the user actuator 52. In the exemplary implementation, when the actuator is actuated for a brief time period, the first communication session is placed in an on-hold status, and the second call is accepted to form a second communication session. By actuating the user actuator an elongated time period, the first communication session is terminated, and the second call is accepted to form the second communication session.

If the user actuator is actuated for only the brief time period to place the first communication session in an on-hold status, additional actuation of the user actuator for a brief time period places the second communication session in an on-hold status, and returns the first communication session to an active status. By activating the user actuator for an elongated period of time, the second communication session is terminated and the first communication session is returned to an active status. Thereafter, subsequent actuation of the user actuator terminates the first communication session.

Figure 2:
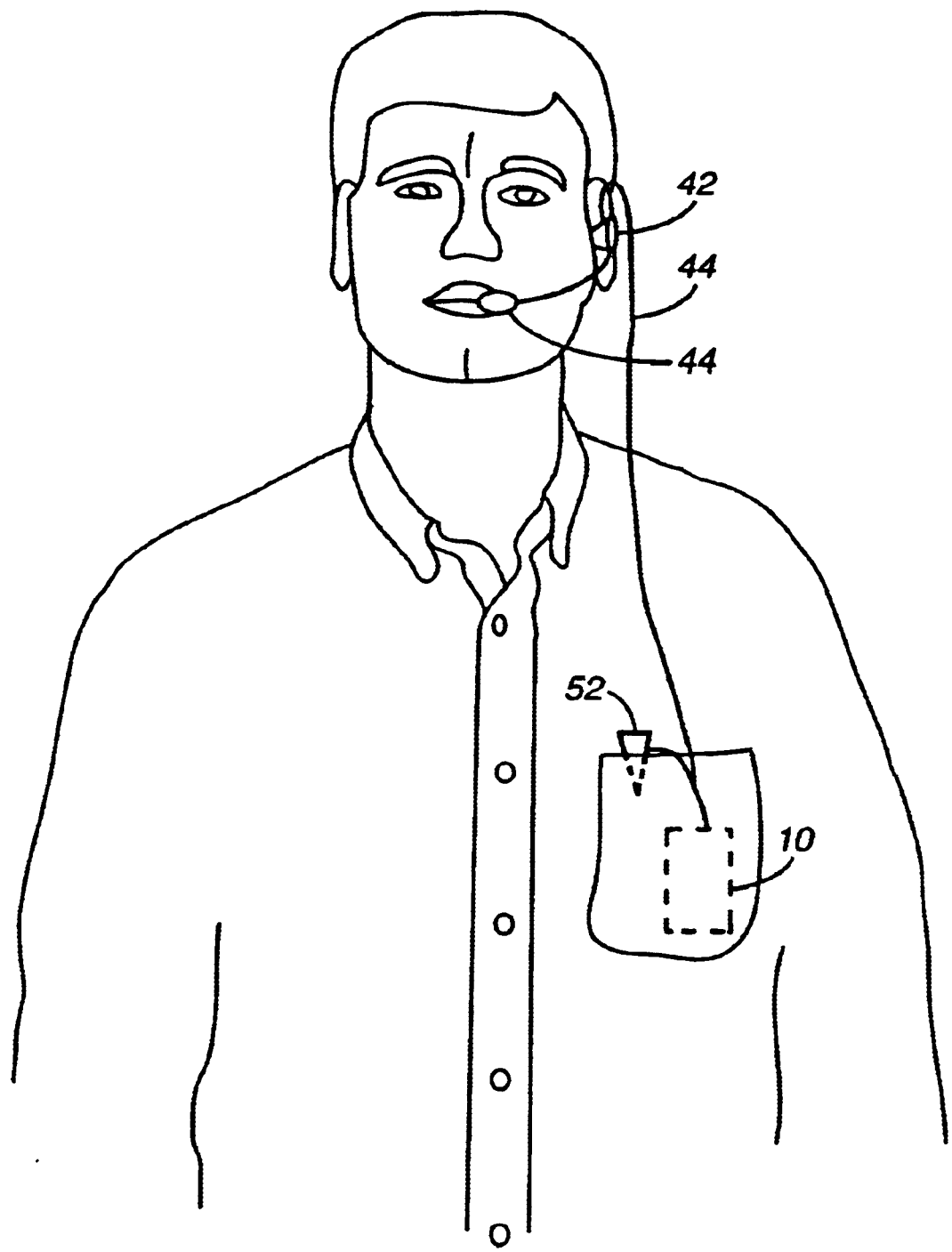
FIG. 2 illustrates a partial functional block, partial perspective view of the mobile station shown in FIG. 1 worn by a user in which the mobile station is operated in a hands-free mode.

FIG. 2 illustrates the mobile station 10 operated by a user 62 when the headset assembly 38 is utilized. As illustrated, the headset assembly is worn by the user such that the speaker element 42 is positioned proximate the ear of the user, and the microphone 44 is positioned proximate to the mouth of the user. During a communication session, the user is able to speak and listen through operation of the microphone and speaker element.

Here, the mobile station 10 is carried in a shirt pocket of the user, and the user actuator 52 is clippingly affixed, by way of the clip member 54, to the shirt pocket of the user. When affixed in position, the user actuator is readily accessible by the user. The user is able readily to actuate the user actuator in a three-call operation. The user is not required to physically access the mobile station to initiate an operation associated with a three-call operation.

Figure 3:
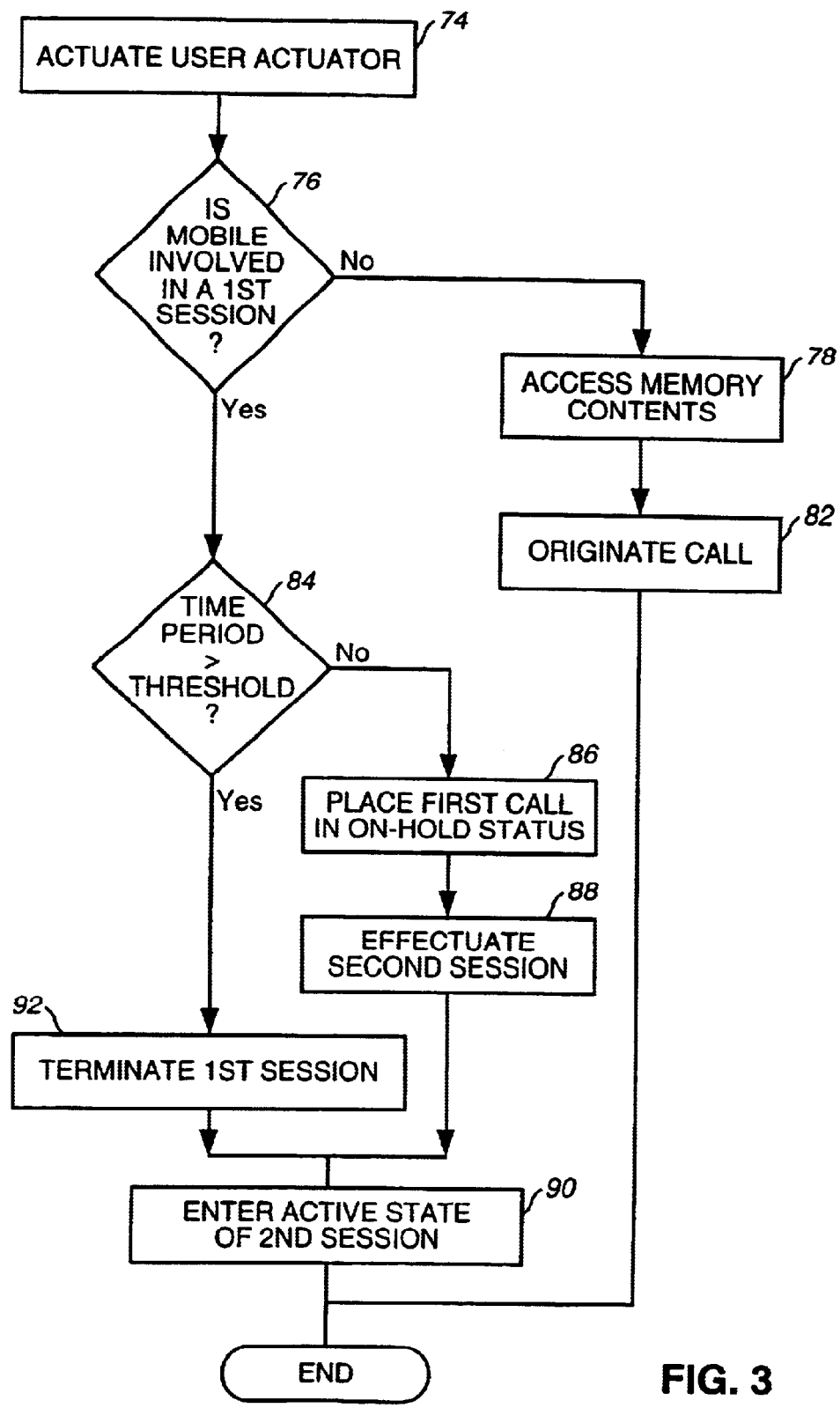
FIG. 3 illustrates a method flow diagram listing the method of operation of an embodiment of the present invention.

FIG. 3 illustrates a flow diagram, shown generally 72, representing operation of the controller 26 during operation of an embodiment of the present invention. Controller 26 is operable, amongst other things, responsive to actuation of the user actuator to operate the mobile station in three-call operations.

First, and as indicated by the block 74, the user actuates the user actuator. Then, and as indicated by the decision block 76, a determination is made as to whether the mobile station is involved in a first communication session. If not, the no branch is taken to block 78 at which a memory location is accessed to retrieve a previously stored dialing number. And, as indicated by the block 82, call origination procedures are initiated to place a call to a remote station identified by the accessed calling number.

If, conversely, the yes branch is taken from the decision block 76, a determination is made, as indicated by the decision block 84, as to the period during which the actuator is actuated. If the time period is less than a selected threshold, the no branch is taken to the block 86 and the first call is placed in an on-hold status and the second communication session is effectuated, indicated by the block 88.

If, conversely, the yes branch is taken from the decision block, the first communication session is terminated, indicated by the block 92, and the second communication session is entered into an active state, again indicated by the block 88.

Thereby, through actuation of the user actuator, three-call operations are effectuated merely by actuating the user actuator 52. Any of various three-call operations are effectuable through actuation of the user actuator.

The preferred descriptions are of preferred examples for implementing the invention, and the scope of the invention should not necessarily be limited by this description. The scope of the present.invention is defined by the following claims.

We claim:

1. In a portable radio device operable in a radio communication system to communicate with a remote station, the radio device having radio circuitry housed at radio housing, an improvement for user interface apparatus for facilitating use of the portable radio device by the user, said user interface apparatus comprising:

a user actuator connectable to the radio device to form a portion thereof, said user actuator separably carriable by the user along with carriage of the radio housing and the radio circuitry housed thereat, said user actuator actuable by the user upon application of an actuation force thereon, actuation of said user actuator selectably for effectuating a selected communication session by way of the portable radio device wherein the radio device comprises a mobile station operable in a radiotelephonic communication system and wherein actuation of said user actuator for selectably effectuating the selected communication session initiates a call originated at the mobile station;

wherein the selected communication session which actuation of said user actuator selectable effectuates comprises a second communication session when an ongoing communication session is effectuated by way of the mobile station; and wherein the radiotelephonic communication system comprises a cellular communication system and wherein the user of the mobile station subscribes to a service subscription pursuant to which communications by way of the mobile station are permitted, the service subscription providing a three-way calling service, the three-way calling service permitting the second communication session to be effectuated while the ongoing communication session is also effectuated.

2. The user interface apparatus of claim 1 further comprising a cable for electrically connecting said user actuator together with the radio circuitry housed at the radio housing of the radio device.

3. The user interface apparatus of claim 1 further comprising a headset assembly including at least a first transducer element electrically connectable to the radio device to form a portion thereof, said headset wearable by the user, and the first transducer element for transducing communication signals used during operation of the radio device.

4. The user interface apparatus of claim 3 wherein the radio circuitry includes a transmit portion and a receive portion, and wherein the at least the first transducer element of said headset assembly comprises the first transducer element and a second transducer element, the first transducer element coupled to the receive portion of the radio circuitry and forming a speaker, and the second transducer element coupled to the transmit portion of the radio circuitry and forming a microphone.

5. The user interface apparatus of claim 3 further comprising a cable for electrically connecting the headset assembly with the radio circuitry housed at the radio housing of the radio device.

6. The user interface apparatus of claim 5 wherein the cable further electrically connects said user actuator together with the radio circuitry housed at the radio housing of the radio device.

7. The user interface apparatus of claim 1 wherein the mobile station includes a memory device for storing a previously-entered dialing number, the dialing number identifying a remote station with which a communication session was previously at least attempted to be effectuated, and wherein actuation of said user actuator to initiate the call originated at the mobile station comprises retrieving the previously-entered dialing number from the memory device and initiating a call request to terminate the call at the remote station identified by the previously-entered dialing number.

8. The user interface apparatus of claim 1 wherein actuation of said user actuator in a first manner places the ongoing communication session in an on-hold status and effectuates the second communication session while the ongoing communication session remains in the on-hold status.

9. The user interface apparatus of claim 8 wherein subsequent actuation of said user actuator returns the ongoing communication session to an active status and places the second communication session in the on-hold status.

10. The user interface apparatus of claim 8 wherein subsequent actuation of said user actuator returns the ongoing communication session to an active status and terminates the second communication session.

11. The user interface apparatus of claim 8 wherein actuation of said user actuator in a second manner terminates the ongoing communication session and effectuates the second communication session.

12. The user interface apparatus of claim 11 wherein the first manner by which said user actuator is actuated comprises continuous actuation for a first time period and wherein the second manner by which said user actuator is actuated comprises continuous actuation for a second time period.

13. In a method for communicating by way of a portable radio device in a radio communication system with at least a first remote station, the radio device having radio circuitry housed at a radio housing, and improvement of a method for facilitating user of the portable radio device by the user, said method comprising:

providing an external user actuator for connecting to the radio device, the external user actuator separably carriable by the user along with carriage of the radio housing and the radio circuitry housed threat;

receiving an indication that the external user actuator has been actuated;

effectuating a selected communication session by way of the portable radio device responsive to selected actuation of the external user actuator during said operation of selectably actuating; wherein said operation of effectuating comprises initiating a call originated at the radio device;

wherein said operation of effectuating comprises effectuating a second communication session while an ongoing communication session is effectuated; and wherein said operation of effectuating the second communication session further comprises placing the ongoing communication session in an on-hold status.

14. The method of claim 13 wherein the external user actuator is coupled to a headset assembly including at least a first transducer element electrically connectable tot he radio device to form a portion thereof, and wherein said operation of connecting comprises connecting the headset assembly, together with the external user actuator coupled thereto, to the radio device.

* * * * *